United States Patent
Liberatore et al.

(10) Patent No.: US 10,878,714 B2
(45) Date of Patent: Dec. 29, 2020

(54) VIRTUAL REALITY BASED PILOT TRAINING SYSTEM

(71) Applicant: Access Virtual, LLC, Willoughby, OH (US)

(72) Inventors: Paul Liberatore, Willoughby, OH (US); David Urchek, Blairsville, PA (US)

(73) Assignee: ACCESS VIRTUAL, LLC, Willoughby, OH (US)

( * ) Notice: Subject to any disclaimer, the term of this patent is extended or adjusted under 35 U.S.C. 154(b) by 0 days.

(21) Appl. No.: 16/266,970

(22) Filed: Feb. 4, 2019

(65) Prior Publication Data
US 2019/0244537 A1 Aug. 8, 2019

Related U.S. Application Data

(60) Provisional application No. 62/625,658, filed on Feb. 2, 2018.

(51) Int. Cl.
*G09B 9/30* (2006.01)
*G09B 9/08* (2006.01)
(Continued)

(52) U.S. Cl.
CPC ............ *G09B 9/302* (2013.01); *G02B 27/017* (2013.01); *G06F 3/016* (2013.01); *G06F 3/0205* (2013.01);
(Continued)

(58) Field of Classification Search
CPC .......... G09B 9/003; G09B 19/24; G09B 9/16; G09B 9/22; G09B 9/302; G09B 9/04;
(Continued)

(56) References Cited

U.S. PATENT DOCUMENTS 3,591,109 A * 7/1971 McLarty .................. B64C 1/06
244/17.19
3,981,465 A * 9/1976 Sinnett ............... B64D 11/0689
244/122 A
(Continued)

FOREIGN PATENT DOCUMENTS

WO 2014123883 A1 8/2014

OTHER PUBLICATIONS

International Search Report and Written Opinion in PCT/US2019/016534 dated Apr. 5, 2019, 13 pages.
(Continued)

*Primary Examiner* — Malina D. Blaise
(74) *Attorney, Agent, or Firm* — Pearne & Gordon LLP

(57) ABSTRACT

A pilot training system includes a training terminal integrated with a pilot training seat with a seat pan having six degrees of freedom, wherein the training terminal is configured to exclusively provide and render a simulated flight-training environment and to output control signals to synchronize movement of the seatpan with the simulated environment. The system is transportable so that it can be used to provide flight training at a user-selected and repositionable location. The system also may include an instructor terminal located at an instructor site. The training site and the instructor site can be remotely located. The instructor may provide remote instruction or training to a trainee, for example by sending instruction inputs to the training terminal over the network in order to control aspects of the simulated environment.

12 Claims, 8 Drawing Sheets

(51) Int. Cl.
| | |
|---|---|
| *G09B 9/04* | (2006.01) |
| *G09B 9/12* | (2006.01) |
| *G09B 9/14* | (2006.01) |
| *G02B 27/01* | (2006.01) |
| *G06F 3/01* | (2006.01) |
| *G06F 3/02* | (2006.01) |

(52) U.S. Cl.
CPC .................. *G09B 9/04* (2013.01); *G09B 9/08* (2013.01); *G09B 9/12* (2013.01); *G09B 9/14* (2013.01); *G09B 9/307* (2013.01)

(58) Field of Classification Search
CPC ... G09B 9/08; G09B 9/12; G09B 9/14; G09B 9/307; G02B 27/017; G06F 3/016; G06F 3/0205
See application file for complete search history.

(56) References Cited

U.S. PATENT DOCUMENTS

| | | | | |
|---|---|---|---|---|
| 5,388,990 | A * | 2/1995 | Beckman | G09B 9/08 345/419 |
| 5,782,639 | A * | 7/1998 | Beal | A63B 71/0622 434/29 |
| 6,027,342 | A * | 2/2000 | Brown | G09B 9/14 434/55 |
| 6,059,253 | A * | 5/2000 | Koutsky | B60N 2/501 248/550 |
| 6,101,431 | A * | 8/2000 | Niwa | G01C 11/00 340/980 |
| 8,827,709 | B1 * | 9/2014 | Gurule | G09B 9/12 434/45 |
| 9,995,936 | B1 * | 6/2018 | Macannuco | G02B 27/0172 |
| 10,070,123 | B1 * | 9/2018 | Yin | G09G 5/10 |
| 2002/0115043 | A1 | 8/2002 | Baker et al. | |
| 2002/0135738 | A1 * | 9/2002 | Cok | G03B 21/00 353/7 |
| 2003/0045402 | A1 * | 3/2003 | Pyle | A61H 1/0214 482/51 |
| 2003/0171190 | A1 * | 9/2003 | Rice | A63F 13/06 482/57 |
| 2004/0077464 | A1 * | 4/2004 | Feldman | A63B 22/0007 482/57 |
| 2005/0069839 | A1 * | 3/2005 | Denne | G09B 9/10 434/29 |
| 2005/0202375 | A1 * | 9/2005 | Nevo | A61B 5/00 434/59 |
| 2006/0046230 | A1 * | 3/2006 | MacDonald | G09B 9/08 434/55 |
| 2006/0079817 | A1 * | 4/2006 | Dewald | A61H 1/02 601/5 |
| 2007/0009862 | A1 * | 1/2007 | Quinn | G09B 9/00 434/38 |
| 2007/0072662 | A1 * | 3/2007 | Templeman | A63F 13/00 463/6 |
| 2007/0281828 | A1 * | 12/2007 | Rice | A63B 71/0622 482/4 |
| 2007/0287133 | A1 * | 12/2007 | Schubert | F41A 33/00 434/11 |
| 2009/0099824 | A1 * | 4/2009 | Falash | G09B 9/00 703/8 |
| 2010/0070248 | A1 * | 3/2010 | Morali | G09B 9/00 703/2 |
| 2010/0266991 | A1 * | 10/2010 | Gregoire | G09B 9/301 434/38 |
| 2010/0279255 | A1 * | 11/2010 | Williams, II | G09B 9/14 434/29 |
| 2011/0238079 | A1 * | 9/2011 | Hannaford | A61B 34/76 606/130 |
| 2012/0282588 | A1 * | 11/2012 | Stevens | G09B 9/14 434/365 |
| 2012/0297695 | A1 * | 11/2012 | Magpuri | E04H 3/22 52/9 |
| 2012/0301853 | A1 * | 11/2012 | Garvis | G09B 9/14 434/58 |
| 2013/0001995 | A1 * | 1/2013 | Garvis | G09B 9/12 297/314 |
| 2013/0169514 | A1 * | 7/2013 | Edwards | G06F 3/04815 345/8 |
| 2013/0183640 | A1 * | 7/2013 | Comtois | G09B 9/28 434/59 |
| 2014/0212848 | A1 * | 7/2014 | Newman | G09B 9/10 434/59 |
| 2014/0213417 | A1 * | 7/2014 | Kuntz | A63B 24/0087 482/8 |
| 2014/0272809 | A1 * | 9/2014 | Martel | G09B 9/30 434/38 |
| 2014/0302462 | A1 * | 10/2014 | Vatcher | A63G 31/16 434/55 |
| 2015/0048933 | A1 * | 2/2015 | Danieau | A63F 13/28 340/407.1 |
| 2015/0061847 | A1 * | 3/2015 | Danieau | G09B 9/00 340/407.1 |
| 2015/0068052 | A1 * | 3/2015 | Krueger | G01C 9/16 33/301 |
| 2015/0104757 | A1 * | 4/2015 | Moncrief | G09B 9/302 434/38 |
| 2015/0187224 | A1 * | 7/2015 | Moncrief | G09B 9/052 434/30 |
| 2015/0346722 | A1 * | 12/2015 | Herz | G05D 1/0038 701/2 |
| 2016/0093230 | A1 * | 3/2016 | Boggs | G09B 9/302 434/38 |
| 2016/0140862 | A1 * | 5/2016 | Van Lookeren Campagne | G09B 9/14 434/55 |
| 2016/0148526 | A1 * | 5/2016 | Morris | G09B 9/04 434/62 |
| 2016/0167672 | A1 * | 6/2016 | Krueger | H04N 13/366 340/576 |
| 2016/0195923 | A1 * | 7/2016 | Nauseef | G06F 3/011 348/121 |
| 2016/0303484 | A1 * | 10/2016 | Masutti | G09B 9/12 |
| 2016/0320862 | A1 * | 11/2016 | Schradin | A63F 13/211 |
| 2017/0025031 | A1 * | 1/2017 | Dreyer | G09B 9/12 |
| 2017/0072327 | A1 * | 3/2017 | Wach | F16M 11/043 |
| 2017/0110023 | A1 * | 4/2017 | Bell | G09B 9/32 |
| 2017/0148340 | A1 * | 5/2017 | Popa-Simil | G09B 9/48 |
| 2017/0221376 | A1 * | 8/2017 | Gosselin | B25J 17/0266 |
| 2018/0089900 | A1 * | 3/2018 | Rober | B60W 10/22 |
| 2018/0113312 | A1 * | 4/2018 | Jung | G16H 20/30 |
| 2018/0286269 | A1 * | 10/2018 | Lechner | G09B 9/165 |
| 2018/0372061 | A1 * | 12/2018 | Vamvas | H02K 7/1823 |
| 2019/0015738 | A1 * | 1/2019 | LeVere | A63F 13/211 |
| 2019/0099678 | A1 * | 4/2019 | Khan | G06T 11/60 |
| 2019/0130782 | A1 * | 5/2019 | Nissen | G09B 9/085 |
| 2020/0035117 | A1 * | 1/2020 | Biddle | G09B 9/12 |

OTHER PUBLICATIONS

Screen captures from YouTube video clip entitled "After Burner Arcade Machine Deluxe Moving Cabinet | One of the Best Arcade Machines Ever #EGX2017," 6 pages, uploaded on Nov. 3, 2017; retrieved from Internet on Jul. 23, 2019 at: https://www.youtube.com/watch?v=VVMmFD9mzCI.

* cited by examiner

VIRTUAL REALITY BASED PILOT TRAINING SYSTEM

CROSS-REFERENCE TO RELATED APPLICATIONS

This application claims the benefit of U.S. Provisional Application No. 62/625,658 filed on Feb. 2, 2018 and entitled Virtual Reality Based Remote Pilot Training System.

BACKGROUND

1. Field of the Invention

The present disclosure is directed to a pilot training system, particularly a system where an instructor and trainee are located remote from one another and the training is performed via simulation.

2. Description of Related Art

General aviation is known for a poor safety record, in part because of pilot-error accidents. These accidents often occur due to inconsistent, poor, and/or limited training. For instance, there are wide ranges of flight conditions that pilots encounter. Without the proper training and resources, pilots can find themselves in situations in which they are unprepared and inexperienced. This is especially true in uncommon flight conditions. In contrast, military and commercial pilots have historically experienced much lower accident rates because they are subject to mandatory and regular training, such as mostly simulator-based training and check rides. Such resources and extensive training are typically too costly to be implemented on a wide scale for general-aviation pilots. And due to experienced pilot turnover, budget constraints, and limited resources, such as aircraft available for training, military and commercial pilots are now finding themselves in similar positions as general-aviation pilots.

Conventional flight simulators are complex, costly, and not widely and readily available to all pilots. This is especially true of general aviation pilots (or otherwise the owners/operators of general aviation planes) However, even for military and commercial entities, the conventional simulators are sometimes cost-prohibitive, are not readily available, and/or are located at a brick and mortar facilities, requiring travel to these facilities at prescheduled times. Further, general aviation pilots usually only fly when time permits in their schedules. And actual flight time is further limited to availability of aircraft (most general aviators do not own their own planes) and as adequate weather conditions allow suitable for training. While flight simulator programs do exist for personal computers, the realism aspect is significantly lacking in such systems. For instance, the software is displayed on relatively small and flat monitors, there are no enclosures, such as in large-scale simulators, and there are no motion cues for the user. Thus, such systems do nothing to simulate the physical environment, which not only detracts from the experience, but cannot provide suitable training for an aircraft pilot. Thus, pilots are currently limited to extremely heavy and large scale simulators that are fixed in position at a single location.

SUMMARY

The following presents a simplified summary in order to provide a basic understanding of the embodiments described herein. This summary is not an extensive overview nor is it intended to identify key or critical elements. Its sole purpose is to present some concepts in a simplified form as a prelude to the more detailed description that is presented later.

According to one embodiment, a pilot training system is provided. The pilot training system includes: a training terminal comprising a processor and flight simulation software, the training terminal being configured for connection to a network; a seat coupled to the training terminal, the seat having a seat pan having six degrees of freedom and being capable of surge, heave, sway, yaw, pitch, and roll in response to a simulated flight environment being generated by the flight simulation software; a head-mounted display configured to display an output of the flight simulation software reflecting the simulated environment, wherein a point of view of the head-mounted display is synchronized to motion of the seat pan; and at least one input device coupled to the training terminal, the at least one input device configured to receive inputs from a trainee seated in the seat to control at least one aspect of the simulated environment, wherein the pilot training system is easily transportable and meets US Federal Aviation Administration standards for a flight simulation training device.

According to another embodiment, a kit for a pilot training system is provided. The kit meets Federal Aviation Administration standards and includes: a training terminal having simulation software, the training terminal being configured for connection to a network; a floor-resting seat with a seat pan having six degrees of freedom; a head mounted display; a plurality of human-machine-interface devices; and at least one removable support, wherein the support is configured for attachment to the seat pan and for supporting at least one of the plurality of human-machine-interface devices, wherein the kit can be easily shipped to and assembled by a user of the simulation software.

According to yet another embodiment, a portable seat for a pilot training system is provided. The seat includes: a floor-resting base; a seat pan; a plurality of actuators positioned between the base and the seat pan, the plurality of actuators being configured to move the seat pan linearly and rotationally along x, y, and z axes; a pedal support removably and adjustably connected to the seat pan via a first support post; and a yoke support removably and adjustably connected to the seat pan via a second support post.

According to yet another embodiment, a pilot training system is provided having a floor-resting seat with a movable seat pan mounted on a seat base, the seat pan having six degrees of freedom and being capable of surge, heave, sway, yaw, pitch, and roll consistent with a simulated flight environment relative to said seat base; a training terminal having a processor and flight simulation software integrated with the floor-resting seat, the training terminal configured to run the flight simulation software and to generate the simulated flight environment, the training terminal also being configured for connection to a network; respective adjustable supports for each of a yoke, a throttle quadrant and a rudder pedal all rigidly linked with the seat pan so as to move synchronously therewith, each of the adjustable support being adjustable relative to the seat pan to configure their respective positions in conformity with a particular aircraft cockpit being simulated in the simulated flight environment; wherein the pilot training system is transportable as an integrated unit to provide flight training at a user-selected and repositionable location.

Other features and aspects may be apparent from the following detailed description, the drawings, and the claims.

BRIEF DESCRIPTION OF THE DRAWINGS

Throughout the drawings and the detailed description, unless otherwise described, the same drawing reference numerals can be understood to refer to the same elements, features, and structures. The relative size and depiction of these elements may be exaggerated for clarity, illustration, and convenience.

DETAILED DESCRIPTION

Figure 1:
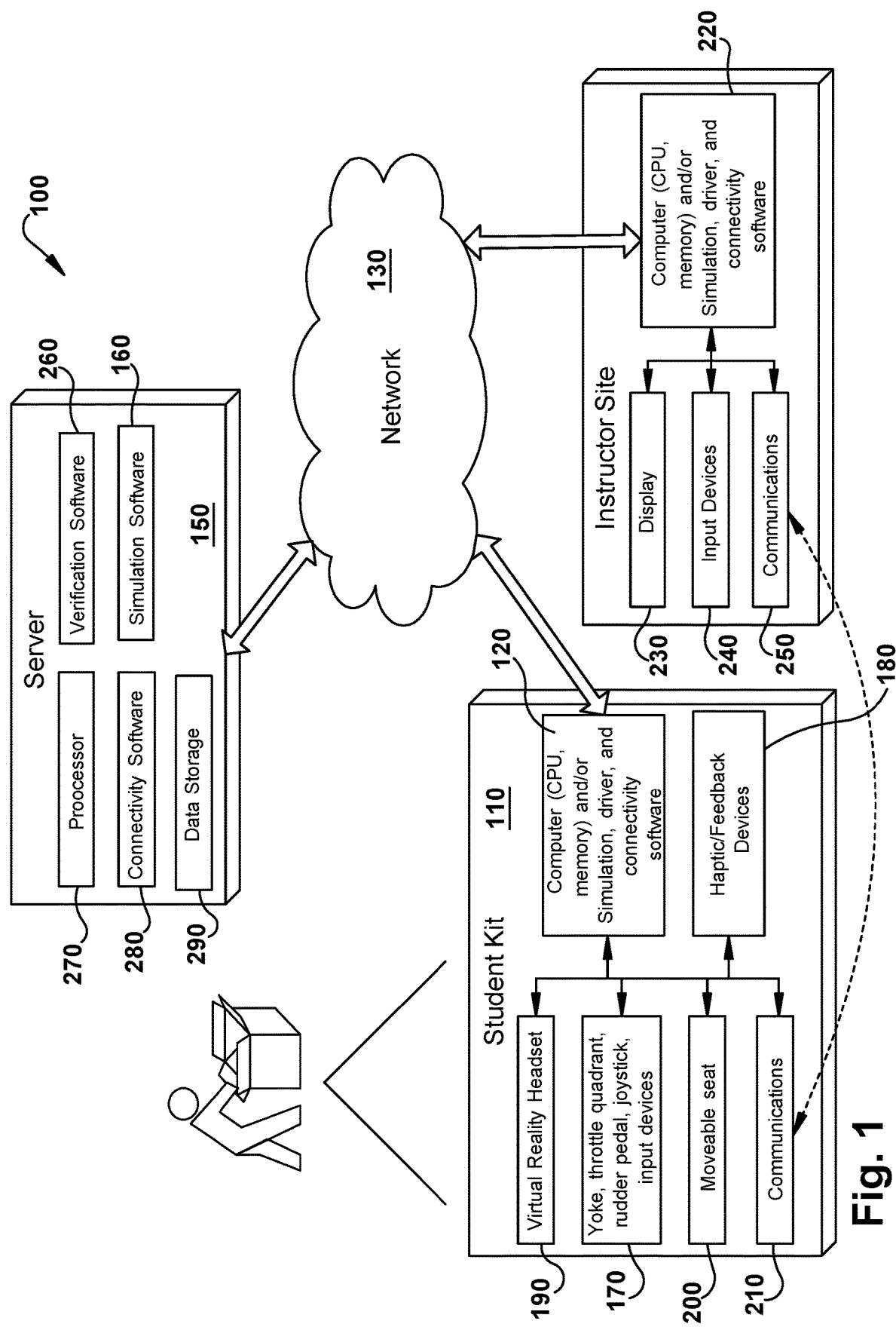
FIG. 1 illustrates a schematic of a pilot training system in accordance with one example.

Example embodiments are described and illustrated herein. These illustrated examples are not intended to be a limitation on the present embodiments. For example, one or more aspects of the system can be utilized in other embodiments and other types of applications. Example embodiments of a system for remote pilot training will be described more fully hereinafter with reference to the accompanying drawings. Such systems may be used for various types of remote training and should not be construed as limited to the embodiments set forth herein. Rather, these example embodiments are provided so that this disclosure will be thorough and complete, and will fully convey the scope of a pilot training system to those of ordinary skill in the art. Like, but not necessarily the same, elements in the various figures are denoted by like reference numerals for consistency. Terms such as "first," "second," "top," and "bottom" are used merely to distinguish one component (or part of a component or state of a component) from another. Such terms are not intended to denote a preference or limit the component to a particular orientation.

The present disclosure addresses the aforementioned deficiencies in pilot training by providing for a lower cost, easily portable, easily adjustable, fully immersive, and full motion flight training simulator. The simulator can be configured to meet applicable regulatory requirements, such as Federal Aviation Administration (FAA) standards for a flight simulation training device, such as Level C and Level D requirements. A system using this simulator would be beneficial, applicable, and accessible to all various types of pilot training, including general aviation, commercial, and military pilot training, as the simulator reduces the high cost of training and the cost and time associated with travel to and from a training facility. These simulators would also provide all pilots the opportunity to practice, which is not currently available with conventional flight simulators.

Referring initially to FIG. 1, an example pilot training system 100 is illustrated. The pilot training system 100 includes a virtual reality simulation kit 110 (hereinafter, collectively the "kit") that includes both hardware and software. For example, the hardware and software can include a computer (central processing unit, memory) and/or simulation, driver, and connectivity software. The hardware and software are collectively referred to herein as a training terminal 120. The kit 110 provides a user, or trainee, with an immersive, high fidelity remote-instructed flight-simulation training session. For example, a trainee interested in a remote pilot instruction session, can acquire kit 110 via purchase, lease, borrow, etc. and connect the training terminal 120 to a network 130, such as the Internet. A remote site 140 can also be connected to the network 130. The remote site 140 may be used by an instructor or trainer in order to control, facilitate and monitor the trainee's training session. Through the network 130, the trainer and trainee can communicate instantaneously and the instructor can control various aspects of the session, such as introduce simulated abnormal flight conditions that the trainee is likely to experience in an actual aircraft, and therefore must learn how to safely navigate. Optionally, a server 150 can be included in the system 100 and be connected to the remote site 140 and training terminal 120 via the network 130. The server 150 can various software, such as simulation software 160, and can be used for administrative and control functions. The server 150 can be remotely located from the training terminal 120. However, it is to be appreciated that the server 150, if used, can be housed at a trainee site or the remote site 140, as desired. The server 150 can interface with the training terminal 120 and an instructor terminal 220 at the remote site 140 as clients, serving to each of them appropriate data to facilitate and/or enhance the virtual training session.

The kit 110 includes various control inputs 170 for connection to the training terminal 120. These control inputs 170 are employed during the training session and provide the trainee with a realistic environment during the aircraft flight simulation. For example, the control inputs 170 can include a yoke or control stick, rudder pedals, throttle, throttle quadrant, joystick, instrument panel, and other input devices. The kit 110 further includes feedback devices 180, such as audiovisual and haptic/physical feedback devices, such as gloves, vests, wearable technology, etc. that can recreate the sense of touch by applying forces, vibrations, or motions to the trainee, thereby simulating a realistic flight training environment. A virtual-reality headset, or head mounted display (HMD), 190, is also provided in the kit 110. The HMD includes at least one or two displays positioned in front of the users eyes so that no matter what direction the user looks, the display remains in front of his/her eyes. A positional tracking device and/or other various sensors can be incorporated into the HMD so that the point of view displayed changes as the user moves his/her head. Also included in the kit is a moveable seat 200, which is preferably a servo-actuated, six degrees of freedom seat 200. The seat 200 can provide a roll, pitch, yaw, heave, sway and thrust movement to simulate the attitude and movements of an aircraft. One or more communications devices 210, which can include sensors, audio, and/or video, are further provided in order for the trainee to communicate with his/her instructor. For instance, these communications devices can include speakers and microphones incorporated into the HMD 190. Each of the control inputs 170, haptic/feedback devices 180, headset 190, seat 200, and communications devices 210 are connected to the training terminal 120. Such connections can be wired and/or wireless, such as via Bluetooth, and are easily made by the user upon receiving the kit 110. With this configuration, the kit provides the trainee an immersive, high fidelity flight simulation experience that can be unpacked, linked to the Internet (or other network) and used for a flight training session whenever and wherever it is convenient for the trainee.

As noted above, an instructor can be located at a remote site 140. Thus the remote site 140 can include an instructor terminal 220 that includes both hardware and software, such as a computer (central processing unit, memory) and/or simulation, driver, and connectivity software. During the training session, the instructor terminal 220 includes a display 230 that provides a replica of a trainee's HMD. Accordingly, the display 230 can show the instructor the simulated flight conditions, trainee flight-inputs, and what the trainee sees and does in real time. Input devices 240 can also be coupled to the instructor terminal 220 to allow the instructor to manage the simulation software, change flight operations, conditions, errors, and the like and generally to provide relevant instruction to the trainee. For instance, the instructor terminal 220 can be a handheld computing device with a touchpad for controlling the software. At least one communications device 250, which can include sensors, audio, and/or video, can be provided to enable the instructor to communicate with the trainee in real time during the training session.

Interactions between the instructor and trainee can occur over the network 130. For instance, the instructor can use the instructor terminal 220 to access simulation software running on the training terminal 120 to change various parameters in the simulation software during a training session. Here, the instructor can monitor and/or control the trainee's experience by failing selected systems and/or changing conditions, such as weather conditions. The trainee and/or the instructor can also have interactions with each other or with the software through the server 150. The server 150 can manage a variety of administrative functions for the system 100. For example, the server 150 can include verification software 260 to verify identities of trainees and/or instructors. Based on the detected identities, access to the system 100 can be limited accordingly to predefined parameters and overall access can be limited to only those with authorization. The verification software 260 can also be used to restrict access to certain components of the system 100 based on user identities and permissions. A processor 270, connectivity software 280, and data storage 290 can also be included in the server 150. Thus, the server 150 has the ability to record individual training sessions, including storing data such as how long a particular session lasted or how many total training minutes a specified user has during a specified time frame. The server can optionally include simulation software 160 if it is desired to run the simulation through the server, rather than through the training terminal 120.

Figure 2:
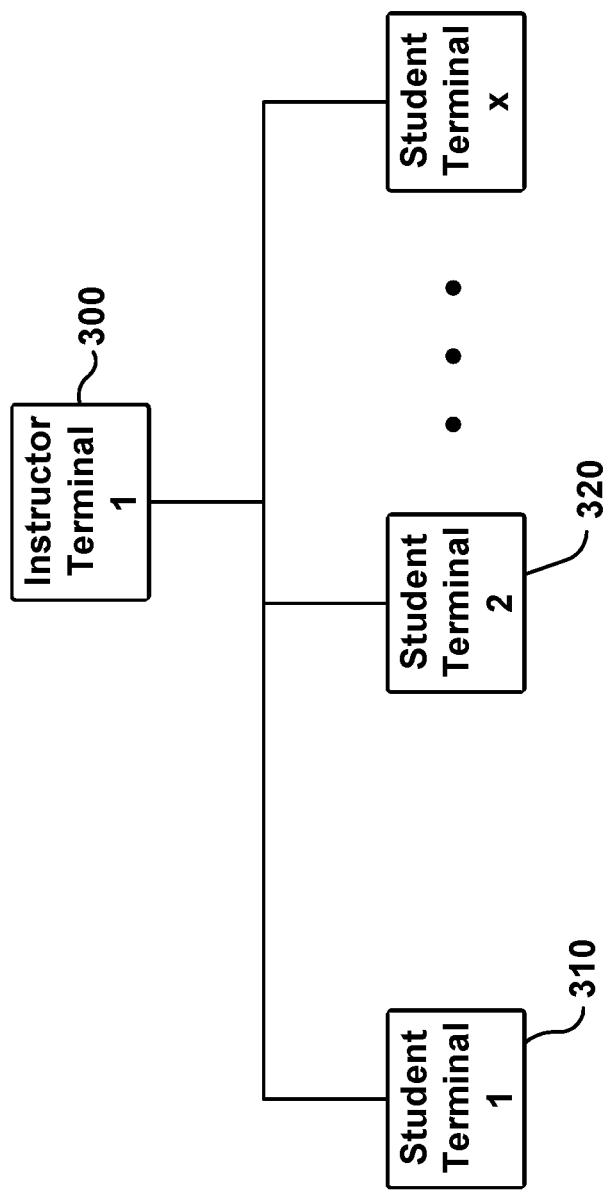
FIG. 2 illustrates a schematic of a pilot training system in accordance with another example.

As shown in FIG. 2, a system can be provided in which a single instructor terminal can be operatively connected with two or more student terminals. Thus, an instructor terminal at a first location 300 can be connected with a first trainee at a second location 310 and a second trainee at a third location 320, in which each of the first, second, and third locations 300, 310, 320 are remote from each other. Multiple other trainees at multiple other locations can be added to the system. It can be up to the instructor to determine a maximum number of trainees. The instructor may run the same simulation for each of the individual trainees or the instructor may provide multiple concurrent simulations. The simulations can be personalized and determined by each individual trainee's experience level and/or training history. Similarly, multiple remote-located trainees can be engaged in a multi-pilot training exercise in a single simulation environment; e.g. to practice cooperative flying (such as combat, mid-air refueling or other coordinated-flight) skills. In still other embodiments, one or more trainees may train (practice) at the same time without an instructor. In all cases, each trainee simulates the piloting of a virtual aircraft from a respective trainee terminal. As described above, the training terminal 120 can be shipped and delivered as a kit 110 to each individual trainee. The kit 110 can be easily assembled and connected by the trainee and includes all the necessary components to provide an immersive simulation environment. The training terminal 120 is configured with the desired simulation software (e.g. X-PLANE®). Thus, once assembled, the system is ready for use. Alternatively and/or additionally, the training terminal 120 can be connected via a network 130 (such as the Internet) to a remote server where the simulation software resides and from which it is served. Either the trainee or a remote-linked instructor can initiate a training session once connected to the server 150.

Figure 3:
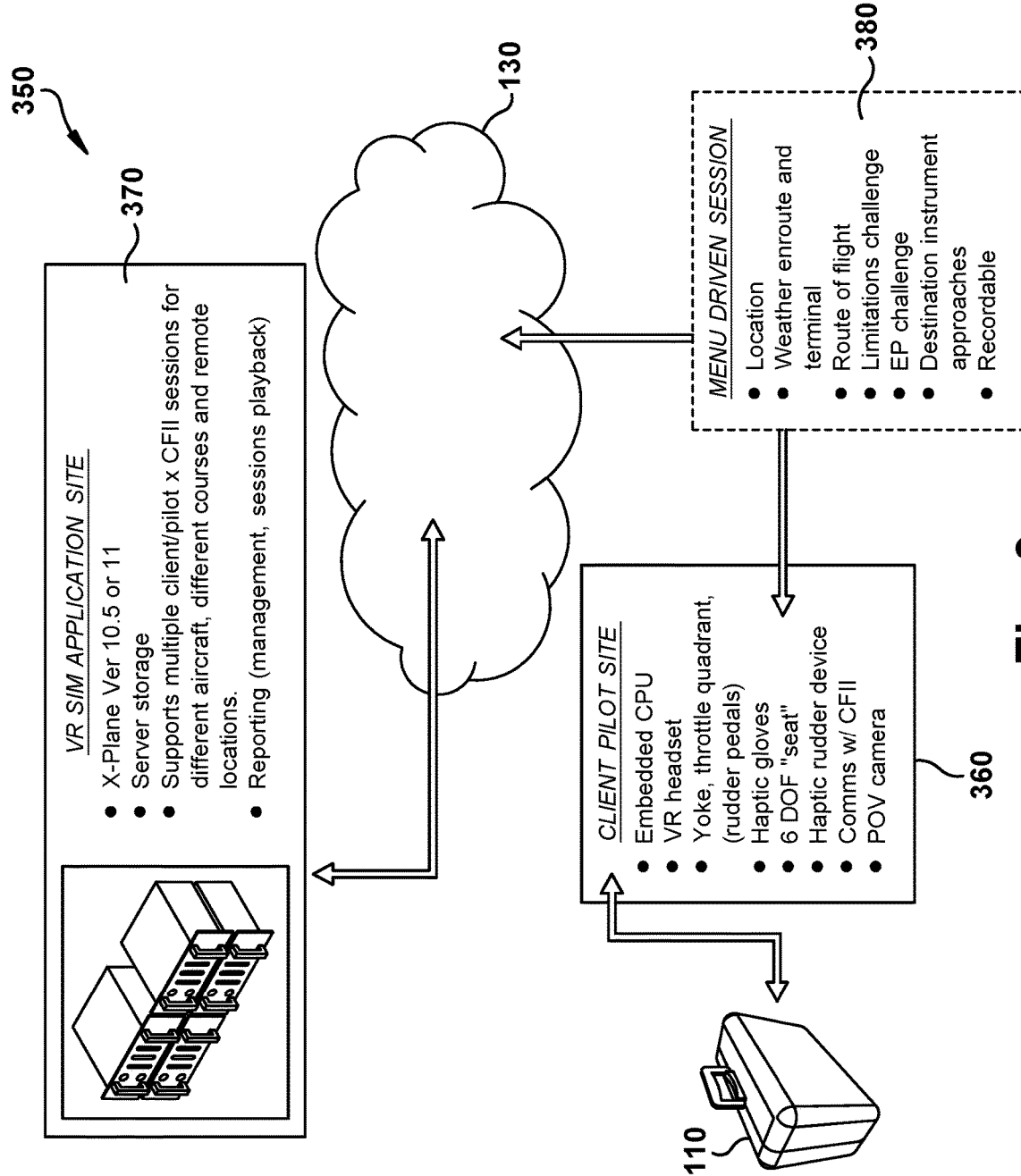
FIG. 3 illustrates an architecture of a pilot training system in accordance with one example.

Turning now to FIG. 3, an example architecture for a pilot training system 350 is illustrated. The pilot training system 350 includes at least one training site 360 where at least one training terminal, such as training terminal 120, resides and operates. The system 350 optionally includes a simulation application site 370 where at least one server, such as server 150, can reside and operate. The training site(s) 360 is typically remotely located from the simulation application site 370. In embodiments with more than one training site, the training sites may be local and/or remote to each other. Each training terminal 120 at the one or more training sites 360 can be connected to one or more servers 150 located at the simulation application site 370 through the network 130. The network 130 can be a local area network (LAN) or a wide area network (WAN), such as the internet or a private intranet.

The simulation software, whether it resides on the training terminal 120 or the server 150, can artificially recreate aircraft flight and the environment in which it flies, including the physics of flight and conditions (e.g., mechanical status, weather) of the aircraft and the virtual world. For example, the simulation software can replicate the equations that govern how the aircraft flies, how it reacts to applications of flight controls, the effects of other aircraft systems, and how the aircraft reacts to external factors, such as air density, turbulence, wind shear, cloud, precipitation, etc. Moreover, the simulation software can accommodate a plurality of trainees, each using a separate training terminal, to simulate respective aircraft flying in the same virtual world. Thus, trainees at the plurality of training sites 360 can interact with each other during training. It is to be appreciated that the simulation software supports a plurality of different aircraft and can include the support of unmanned vehicles, such as drones. If hosted at the simulation application site 370, client instances of the simulation software can be provided on the training terminal 120, such that simulation software on the server 150 coordinates an integrated simulation for each participating trainee. In other words, each trainee controls his/her own unique aircraft in the same virtual world. Notably, in addition to pilot training, the simulation software can also be used to facilitate the design and development of the aircraft itself and/or for research into aircraft characteristics and control handling qualities.

The simulation application site 370 further includes data storage 290 that is capable of storing each recorded individual simulation so that it may be later reviewed by the trainee and/or the instructor. In this regard, training session information for individual trainees can also be replayed, reported, analyzed, graded, etc. Alternatively, this information can be logged at each individual training site and transmitted to an instructor via the network 130.

As noted above, each training terminal 120 can be packaged as a kit, such as kit 110, which is shipped or delivered directly to trainees at convenient locations (e.g. their homes). The kit 100 includes all of the elements necessary to interface with external components, such as the remote server 150. If the simulation software is hosted on the server 150, the plurality of human-machine-interface (HMI) devices 170, 180, 190, 200 can be employed to interface the trainee with the simulation software on the server. A client instance of the simulation software running at the training site 360 allows the trainee to run the simulation on a computer at his own remote location by controlling the virtual aircraft with the HMI devices 170, 180, 190, 200. These HMI devices 170, 180, 190, 200 can simulate the visual and physical flight experience of a real cockpit environment in the same manner used when the software is provided directly on the training terminal.

It is to be appreciated that by providing the simulation software directly on the training terminal 120, a trainee-driven simulation session 380 can be provided solely at the training site 360. In other words, no network connection is necessary. For example, the trainee can select the location of the flight operation, weather, flight route, aircraft limitations, emergency procedures, destination instrument approaches, and recording/save settings. This allows the trainee to tailor a simulation to provide training or practice in specific, user-selected conditions or events in order to, for example, practice upcoming flight patterns and/or receive general practice, outside of a live instructor-led training course. Additionally, training courses can be developed by instructors as at-home study courses to be conducted and recorded by the trainees, which can be sent to and later reviewed by the instructors. In these trainee-driven sessions, the trainee initiates the simulation and control of the aircraft in the simulation is performed at the training site 360 via the HMI devices 170, 180, 190, 200 that form part of or interface with the training terminal 120.

If the training site 360 is connected to the network 130, it can be linked with a plurality of training terminals 120, located at the same or different trainee site(s). In this configuration, teams of pilots can practice cooperative maneuvers together. For example, a military squadron can simulate and practice an upcoming mission.

Figure 4:
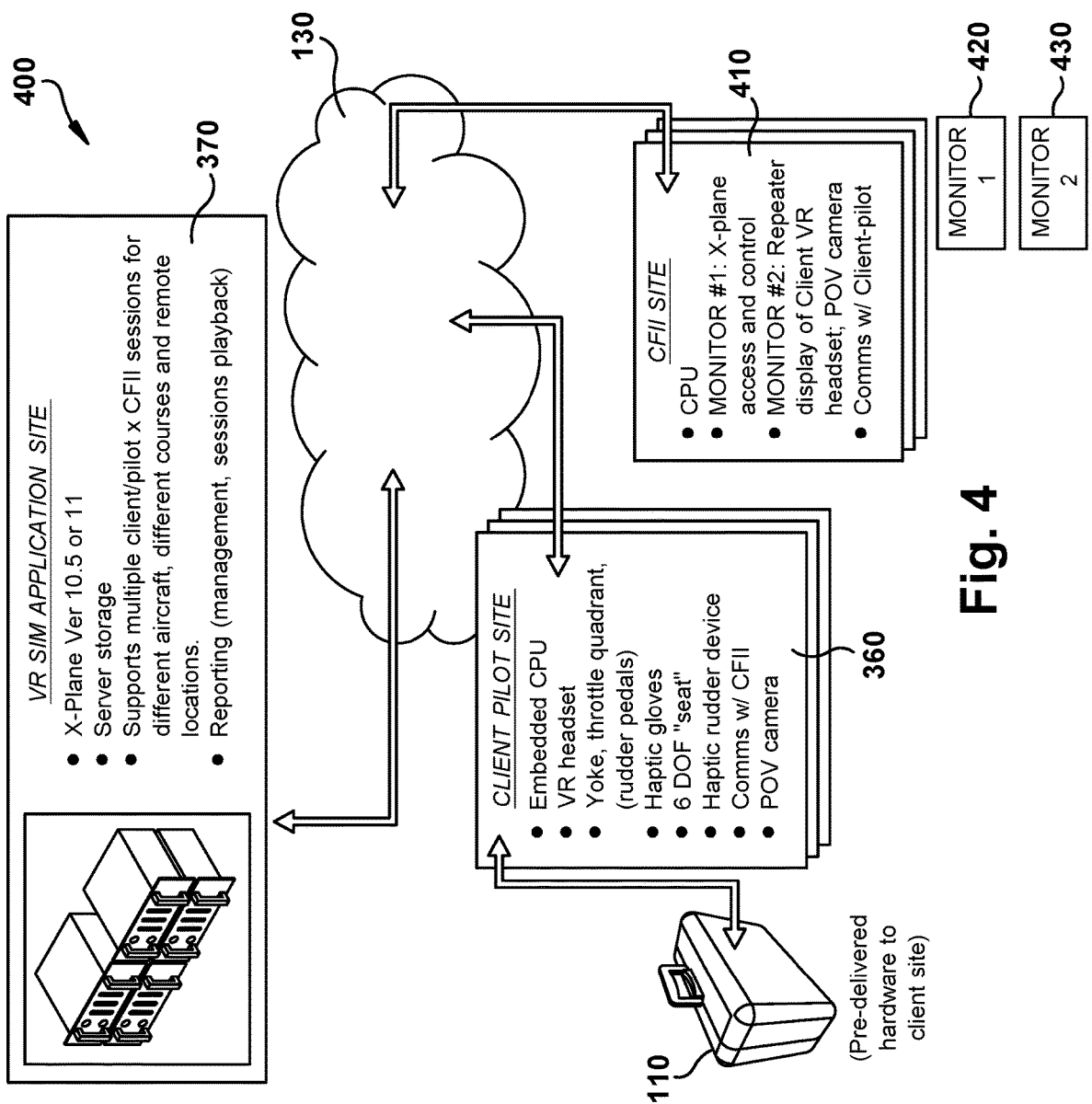
FIG. 4 illustrates an architecture of a pilot training system in accordance with another example.

FIG. 4 illustrates another example architecture for a pilot training system 400. This system 400 includes an instructor terminal, like instructor terminal 220, located at an instructor site 410. Like the training terminal 120, the instructor terminal 220 includes a computer/processor such as a CPU that can have a client instance of the simulation software thereon. The instructor terminal 220 can be connected to the server 150 at the simulation application site 370 through the network 130. The training terminal 120 and the instructor terminal 220 are also connected through the network 130. Thus, there is bidirectional communication between the instructor site 410 and the training site 360.

The instructor terminal 220 can include multiple displays, such as first monitor 420 and second monitor 430. For example, first monitor 420 can include a touch display and can provide access/control to the simulation software, whether running on the training terminal or on the server 150, or to a client instance running on the instructor terminal 220. This allows the instructor to set conditions, such as those noted above, for the simulation. The conditions may be set prior to or during the simulation to dynamically test a trainee's reaction to a particular flight scenario. For example, the instructor may control the simulation to simulate an engine failure in the middle of the training session. The second monitor 430 of the instructor terminal 220 can be a view of what the trainee sees through his/her display (e.g., a virtual reality (VR) headset device) in real time. Alternatively or additionally, the second monitor 430 can show images from a POV camera at the training site 360. Accordingly, through the second monitor 430, the instructor can see what the trainee sees from the trainee's own vantage during the training session. In this manner, the instructor can better understand and analyze how the trainee responds to various situations, including how the trainee reacts and the steps taken in response to a flight-condition input(s) triggered by the instructor.

Still further, the instructor terminal 220 includes at least one communication device 440 for communicating with the training terminal 120. Preferably, this communication occurs via the connection between the training terminal 120 and the instructor terminal 220 through the network 130. An Internet-based network is a preferred network for communication between remote terminals (e.g. the server 150 and each trainee and instructor terminal 120, 220) for a training session. However, other communication networks could be used, for example a cellular network, a local-area network or other wide-area network (other than the Internet), which can be wired or wireless. Such communication between the trainee- and instructor-terminals also may be direct via the network 130, or it may proceed via the server 150 at the simulation application site 370.

To make the systems discussed herein accessible to pilots at any location, such as general-aviation pilots and others that do not otherwise routinely have access to expensive simulators, or who do not routinely schedule flight-training, the kit 110 can be delivered directly to the training site 360 (such as a private residence). As described above, the kit 110 includes the components of the training terminal 120 along with various HMI devices and can provide a realistic and immersive virtual reality experience suitable for formal pilot training. Preferably, all contents of the kit 110 can be packaged together in a single deliverable package (e.g., a single box or suitcase) to the trainee, with instructions for assembly/installation of its contents to produce the functioning training terminal 120 and to link it to a network 130.

In particular, the kit 110 preferably includes a CPU with either a full simulation software package or a smaller client instance of a simulation software package installed. The CPU also includes a network application for remotely connecting to the server 150 and software (e.g. drivers) for interfacing with HMI devices 170, 180, 190, 200. The HMI devices 170, 180, 190, 200 can be supplied as part of the kit 110 with the CPU and the simulation software 160. The kit 110 can also include various add on components that can interface with the training terminal to provide additional content to the simulation software. For example, a weather module can be included to seamlessly provide various additional weather situations within the flight simulation software.

The HMI devices 170, 180, 190, 200 include any of a variety of devices that provide a sensory interface between the simulation software and the trainee and can serve as inputs for the trainee to control an aircraft in a simulation.

Each HMI device 170, 180, 190, 200 is capable of receiving and/or transmitting data to/from the CPU at the training site 360. For input devices (where an input signal alters an aspect of the simulation), the signal processing from the HMI device 170, 180, 190, 200 is performed locally at the training site 360; however, it can be performed remotely at the simulation application site 370, if desired. The signals from each HMI device 170, 180, 190, 200 is interpreted by the simulation software running at the training site 360 and the simulation is updated accordingly (e.g., by updating the display). These updates may then be transmitted to the server 150 at the simulation application site 370 or directly to the instructor terminal 220 and optionally, to other training terminals 120 in a cooperative simulation, all via the network 130. In this example, the processing of simulation inputs and rendering of the resulting outputs in the simulation are primarily performed at the training site 360 (from which the input originated) by the training terminal CPU. However, each site could also independently process the inputs in response to receiving the raw input signal from the originating training site 360.

In other embodiments, the input signals from HMI devices 170, 180, 190, 200 may be first transmitted over the network 130 to the server 150 at the simulation application site 370. The server instance of the simulation software 160 can then interpret the signals from the HMI devices 170, 180, 190, 200 at the training site 360 and then update the simulation. Resulting outputs and information can then be communicated with all other remote instances of the simulation software at other sites participating in the same training session (e.g. an instructor terminal 220 and the training terminal 120 from which the input signals arose). The above processing distribution amongst each site of the system's architecture may be static (i.e., preconfigured) or dynamic (i.e., change during the simulation, for example, based on network conditions). In short, any portion of the processing can be distributed across any portion of the system architecture.

The HMI devices 170, 180, 190, 200 of each kit may be wired or wireless and can include, but are not limited to:

1) display (e.g., head mounted display, virtual reality headset);

2) point-of-view (POV) camera;

3) yoke, throttle, throttle quadrant, rudder pedals, joystick, buttons, switches, and other push-button or toggle-switch/knob input devices;

4) haptic and other sensual feedback devices (e.g., gloves, vest);

5) moveable seat (e.g., having six degrees of freedom);

6) communication devices (e.g., microphone and speaker, which may be built-in to one of the other HMI devices, such as the display); and 7) sensors, such as to track and monitor eye movements and fixations, pulse, heart rate, body temperature, and other physiological data.

The simulation software outputs a display that constitutes a visual representation of the simulation from the vantage point of the trainee in real-time. In some embodiments, the display includes virtual reality headset. The display can thus visually simulate the view of a pilot inside an aircraft cockpit during a simulation. The display preferably has a high resolution and high refresh rate for each eye (e.g., 1920× 1080, 4096×2160 at 90 Hz) and a large field of view (e.g., at least 150 degrees). The VR headset can also preferably detect six degrees of freedom in motion so that the display is updated as the trainee moves his/her head in either direction about each of the three common axes that define a three-dimensional space (X, Y and Z). In other words, the trainee may "look around" the cockpit by moving his/her head naturally, and the trainee will see whatever would normally appear as if he/she were in a real airplane cockpit looking in that direction. For example, as the trainee's head moves to the left, the display is updated to show a left side of the cockpit. This may be accomplished, for example, with sensors or the like that detect head movement and attitude/orientation of the headset (e.g., located in the headset). These sensors (and the corresponding output signals) would then be treated as an input to the simulation software causing the simulation to update (e.g., by updating the display) according to the movement of the head detected by the sensors. By way of example, the display may be an OCULUS RIFT® virtual reality headset or the like.

The kit also preferably provides a POV camera so that the instructor may see the trainee and/or what the trainee sees. The camera may be an actual camera that takes images or video of the body and head position of the trainee, which are then transmitted in real time to the second monitor 430 at the instructor site 410. The POV camera can also be embodied by intercepting or otherwise capturing the raw output of the trainee's display, and sending that information over the network 130 to a display at the second monitor 430. In other words, the second monitor 430 would be simply parroting the trainee's display. Alternatively, the display signal output by the simulation software to the display may also be sent directly to the instructor.

The yoke, throttle quadrant, rudder pedals, buttons, switches, and like input devices 170 may correspond to appropriate or analogous control inputs that might be found in a cockpit. Preferably, these input devices 170 are physically modeled to look like, and respond like, the analogous controls in a cockpit. As above with the head movement sensors, output signals from the input devices 170 are sent to the client instance of the simulation software where they can be interpreted and the simulation updated accordingly. For example, as the yoke is pulled pack, the simulated airplane pitches upward in the simulation corresponding to actuation of its elevator control surface.

Haptic (and other sensory) feedback devices 180 may also be provided as part of the kit 110 to provide life-like feedback of interactions with other HMI devices during a simulation. These interactions can facilitate the establishment of muscle memories for the pilot/trainee. These feedback devices may be independent or part of other devices in the kit 110 that interface with the training terminal 120. For example, haptic gloves and/or other wearables can provide feedback via vibrations (e.g., via piezoelectric elements) or heat (e.g., via resistive elements) to a trainee's hands as they touch input devices or simulate-touch virtual control inputs that are represented in the trainee's display as part of the virtual world, but which do not exist or have physical analogs in the real world. For example, if a device vibrates, is textured, or is hot in actual use in an actual aircraft, then these sensations can be simulated via comparable sensory outputs in haptic gloves. In other embodiments, haptic feedback features may be integrated with other HMI input devices. For example, the devices themselves may vibrate, be textured, heat up, offer progressive or static resistance to being actuated or adjusted, or the like. Further, other sensory feedback devices may be provided. For example, an olfactory device may emit odors or scents that a pilot might experience corresponding to events in the simulation. For example, a smoke or gasoline scent can be emitted during an engine failure simulation to provide a more immersive experience.

Figure 5:
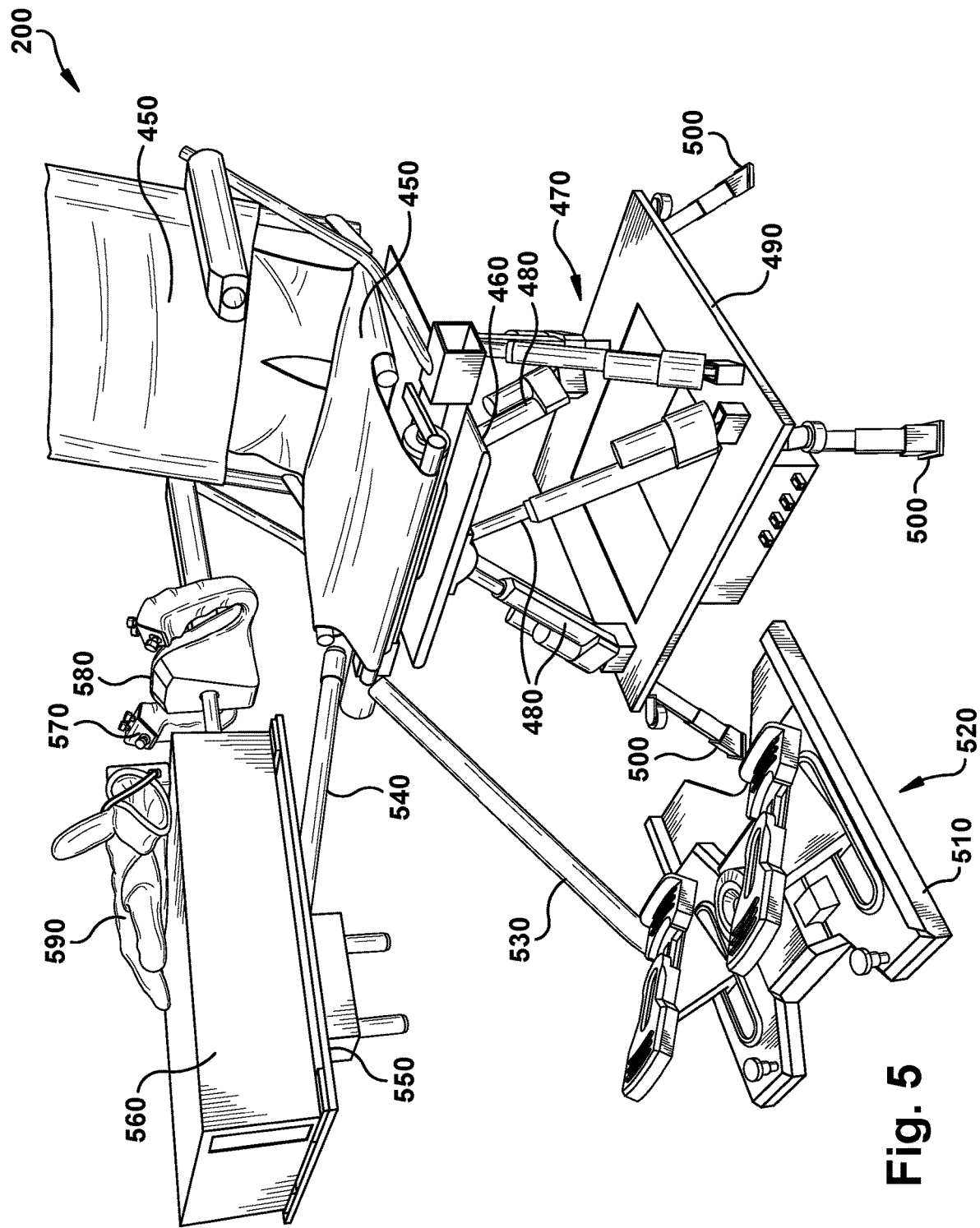
FIG. 5 illustrates a perspective view of a six degrees of freedom seat for a pilot training system in accordance with one example.

In preferred embodiments the kit 110 also includes a moveable seat 200 to simulate changes in the orientation and attitude of the simulated cockpit during the simulation. An example seat 200 that can be supplied with the kit 110 is illustrated in FIG. 5. The seat 200 includes a seat support 450 configured to support the trainee during a training session. The seat support 450 can be configured to resemble a conventional pilot seat to further facilitate a realistic experience during the training session. The seat support 450 is mounted to a seat pan 460, which is configured to be moved and adjusted throughout six degrees of freedom, such as through a Stewart platform 470. Six prismatic actuators 480, such as hydraulic jacks or electric actuators, are attached in pairs to three positions on a bottom side of the seat pan 460 and to three positions on a top side of a base 490. Through action of the actuators 480, the seat pan 460 and seat support 450 can be moved linearly along x, y, and z axes (and a combination of them to simulate surge, heave, and sway) as well as rotationally to pitch, roll, and yaw, including all combinations thereof. Thus, a trainee supported on the seat 200 can rotate and translate in any direction or about any imaginary axis, within defined limits. The ability to combine such rotation and translation in and along three perpendicular (roll, pitch and yaw) axes in response and to replicate real-time flight-simulation actions provides an immersive pilot-training experience for the trainee. The seat 200 operatively communicates with the simulation software such that during a simulation, the seat 200 simulates the real-time attitude and movement of an actual aircraft cockpit found in actual flight so that this experience is replicated during a training session.

The base 490 can optionally include adjustable legs 500 for adjusting an overall height of the seat 200 or for leveling, as needed. Alternatively, the base 490 can rest directly on a floor or fixed to a piece of furniture (such as a chair or bench) at the trainee site. The training terminal 120 can be secured to the base 490 to further reduce a footprint of the pilot training system. The seat 200 also includes a rudder pedal support 510 that is configured to support and facilitate connection of rudder pedals 520. The rudder pedal support 510 can be adjustably connected to the seat pan 460 via a first support post 530 and positioned such that the distance between rudder pedals 520 placed on the pedal support 510 and the seat support 450 mimic a desired aircraft cockpit. The rudder pedals 520 can be commercially available foot pedals configured for flight simulation. The seat pan 460 includes a second support post 540 that can adjustably support a yoke support 550. Thus a flight simulator yoke 560 can be positioned a distance to mimic the desired aircraft configuration. The yoke 560 includes a steering column 570 and handgrip 580 that resembles the desired aircraft. A throttle quadrant support 585 can also be coupled directed to the seat pan 460. Haptic gloves 590 are also illustrated. As shown, the seat 200 is of a size that can be easily transported and moved to a desired location and forms part of an FAA approved pilot training system. For instance, a footprint of the seat 200 is defined by the base 490 and legs 500 and the pedal support 510. The seat 200 does not require a large, dedicated, permanent seat pan, as needed with typical pilot training systems.

Figure 6:
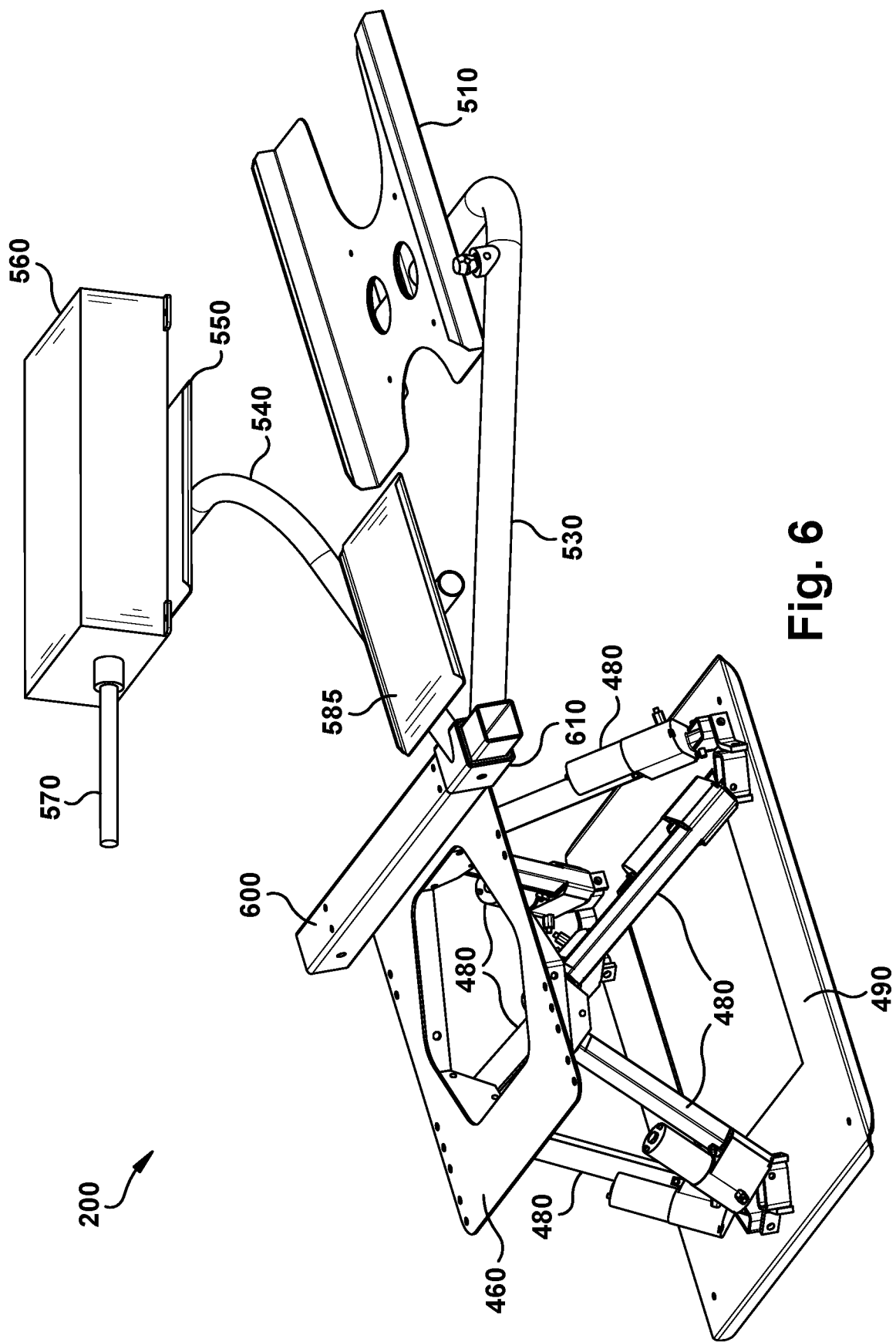
FIG. 6 illustrates a perspective view of a frame of the six degrees of freedom seat for a pilot training system.

FIG. 6 illustrates a frame of the seat 200. The seat pan 460 includes a generally horizontal support column or beam 600 secured thereto. The support column 600 is preferably made of steel or like material for strength and can be bolted and/or welded to the seat pan 460 as desired. The support column 600 has a square or rectangular cross section and is configured to receive a correspondingly shaped collar 610. The collar 610 has an interior configuration adapted to slidingly and removably engage an outer dimension of the support column 600. Because the collar 610 and support column 600 are of a rectangular or square cross section, the collar 610 is prohibited from rotating with respect to the support column 600. It is to be appreciated that the support column 600 and collar 610 can be of any suitable configuration in order to provide an adjustable and removable support for the various input devices. Each of the first support post 530 and the second support post 540 are secured to the collar 610. Thus, each of the pedal support 510, yoke support 550, and throttle quadrant support 585 can be supported by the seat pan 460 via the support column 600, collar 610, and first and second support posts 530, 540. This configuration allows for easy assembly and disassembly of the supports 510, 550, 585 from the seat pan; thereby facilitating easy portability and transportation of the seat 200 to any desired location(s).

Figure 7:
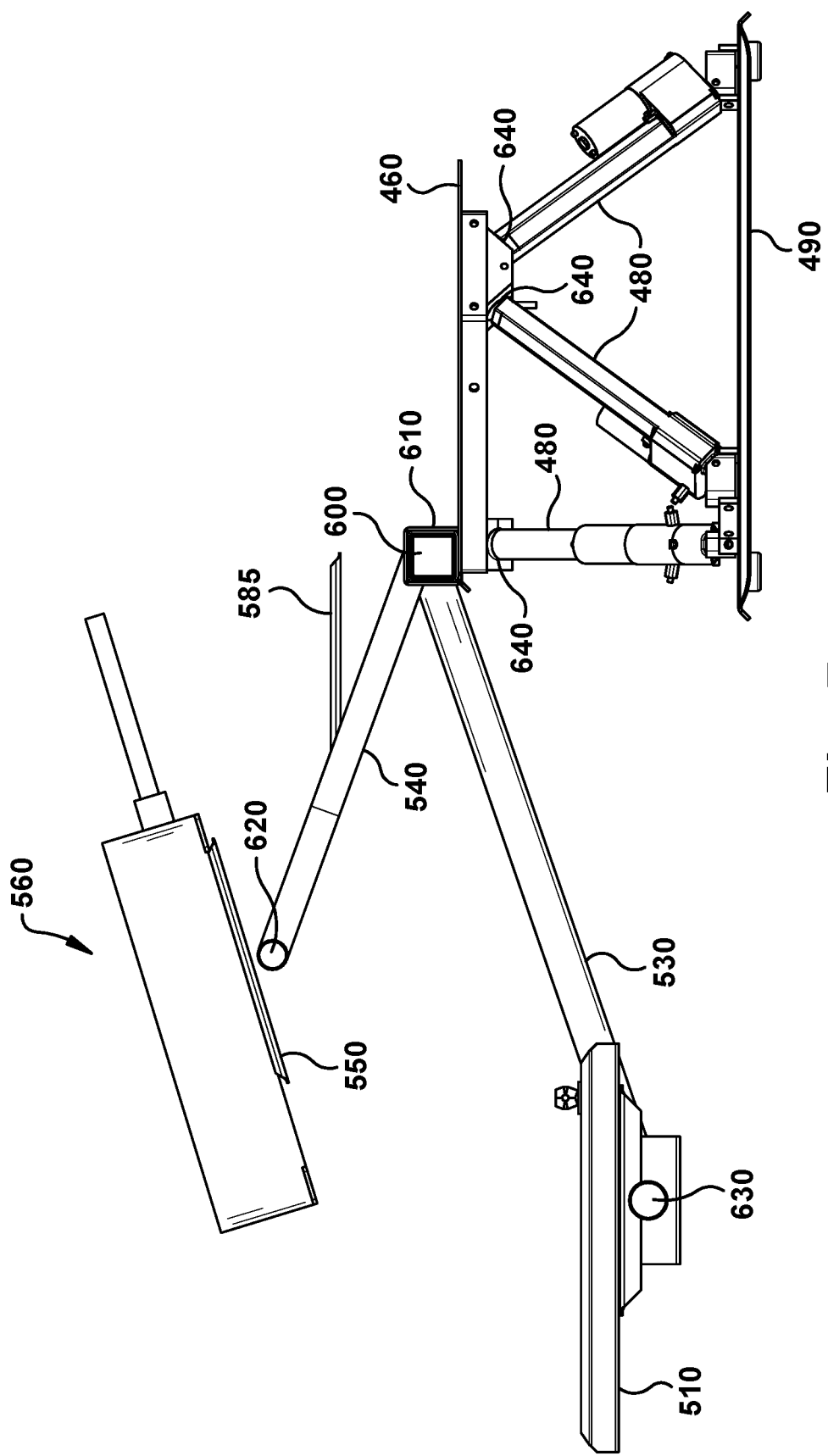
FIG. 7 illustrates a side view of the frame for the six degrees of freedom seat of FIG. 6.

As shown in FIG. 7, the yoke support 550 can be pivotally connected to the second support post 540 such that the yoke support 550 can be tilted or rotated about axis 620. Likewise, the pedal support 510 can be pivotally connected to the first support post 530 such that the pedal support can be tilted or rotated about axis 630. While not shown in detail herein, the throttle quadrant support 585 can be similarly configured, if desired. The lengths of the first and second support posts 530, 540 can also be adjustable via a telescoping motion. Thus, the seat 200 is fully adjustable in order to mimic a desired aircraft. If desired, the seat components, such as the first and second support posts 530, 540, yoke support 550, pedal support 510, and throttle quadrant support 585 can include various markings relating to different, common types of aircraft in order for a user to quickly and easily adjust the seat 200 to predetermined settings.

Figure 8:
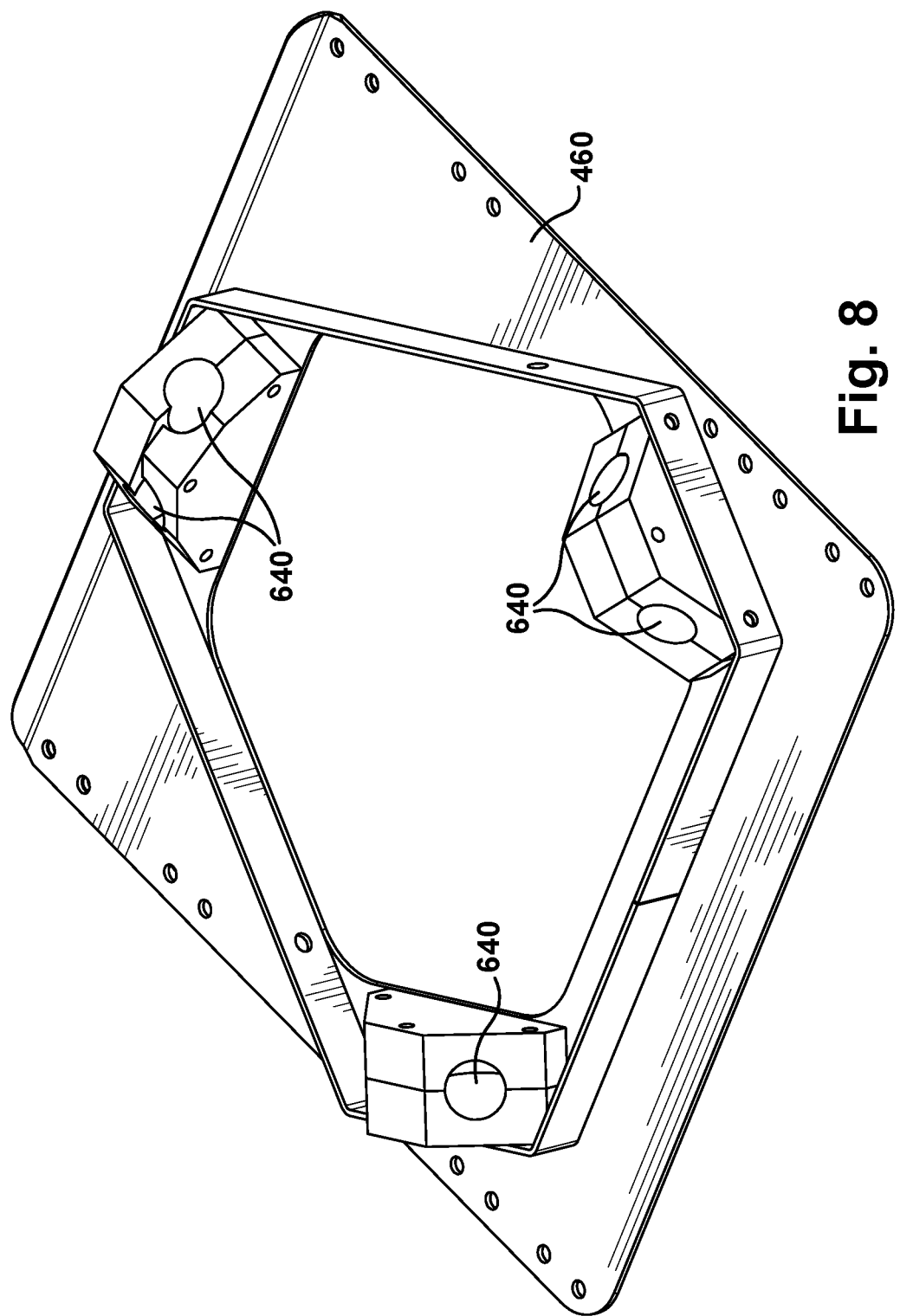
FIG. 8 illustrates a bottom view of a seat pan used in a six degrees of freedom seat for a pilot training system.

Turning back to the actuators 480, FIGS. 7 and 8 illustrate how the actuators 480 are coupled to the base 490 and seat pan 460. Each of the actuators 480 has a first end 650 and a second end 660. The first end 650 of actuator 480 is fixed to the base 490, such as via a bracket and/or fastener. Thus, the first end 650 of actuator 480 does not move with respect to the base 490. The second end 660 of actuator 480 includes a ball end configured to form a ball joint with a mating socket 640 formed in or coupled to a bottom side of the seat pan 460. This ball joint allows for free rotation in two planes while preventing translation in any direction. Translation is provided by a telescoping action of the actuators 480.

Accordingly, the seat support 450 that is coupled to the seat pan 460 is capable of rotation along all three axes of movement (roll, pitch, yaw) via the ball joints and can translate along those axes (heave, sway, and surge) via a telescoping motion of the actuators in order to provide a realistic, immersive experience to the pilot trainee as he/she participates in a training session. The actuators are controlled by outputs of the client instance of the simulation software. For example, as the aircraft in a simulation banks to the right, the actuators 480 cause the seat pan 460 and thus, the seat support 450, to roll right.

The system described herein may be deployed to instructors and trainees in various ways. According to one example, a flight training company may own (or lease) and operate the simulation application site 370 (including the server(s) and software thereon), as well as kits 110 that can be provided or delivered to individual trainees at remote trainee sites 360 in order to set up a training terminal 120 at those sites. Typically an instructor will not require the feedback hardware necessary to create an immersive simulation environment, as he is merely monitoring and instructing the trainee not himself practicing the flight maneuvers. Thus, all of the hardware in each of the aforementioned kits for producing a training terminal 120 may not be necessary. However, a similar kit having a CPU, one or more monitors or other displays, input devices (such as a keyboard) for inputting flight-condition information, and communications hardware, also can be produced and sent to an instructor at an instructor site 410. Because an instructor is less likely to be a transient user of the system, but instead likely will continually instruct successive trainees over a period of time, the instructor terminal 220 need not be as modular, compact and easily transportable as the trainee terminal 120, which is supplied as part of a shippable or transportable kit 110.

A trainee enrolled in a flight training class with the company may then preferably be provided with the above-described kit 110. The kit 110 may be also leased to the trainee for the period of time he/she is enrolled in the class, or leased or sold outright to the trainee if the trainee intends to make a regular routine of training sessions or use the system to practice. At the conclusion of the class, the kit 110, is repackaged and sent back to the company. For this reason it is desirable that the training terminal 120 be readily packaged into the transportable kit 110 (e.g. into a shippable metal or strong plastic, re-sealable container) for repeated transport. The instructors, through their employment/contracts with the company, are also provided with the software, computer, communications, and displays used for the instructor site 410. Again, these elements may be sold outright or provided for a limited term while the instructor is performing instruction for the company.

Preferably, the client software running at the instructor site 410 is not a full instance of the simulation software. That is, it is not executable as a standalone application, without connection to the simulation software 160 running on training terminal 120, or alternatively, on the server 150 at the simulation application site 370. The training terminal 120 can be configured with verification software as well. For example, when executed, the simulation software can require a log-in or other confirmation with the verification software. This ensures that the simulation software is provided only to those trainees that are customers of the company, and then only within and according to their contracts for receiving training or simulation services. Similarly, the various instances of the simulation software may be provided as a service (Software as a Service). In another example, the software executed at the training site 360 can also be a client instance, as in the instructor terminal. Here, the software executed at the training site 360 may merely provide a 'front-end' for interaction with the simulation performed by the server 150. In this manner, processing for the simulation is primarily executed by the simulation software 160 at the simulation application site 370. However, the processing power may dynamically shift to each site depending on network conditions (e.g., connectivity, bandwidth, speed, and the like), the desirability to locally process control inputs and feedback outputs, etc.

In other embodiments, trainees may lease or purchase a license to the system for a particular time frame. For example, a trainee may lease a simulation or purchase a license to use the system for a period of months or years. During this period, the simulation software is accessible at will by the trainee, and the kit 110 is provided to the trainee for the duration of the period. In this manner, the trainee may practice flight in the simulator on his own time and on his own schedule.

In some embodiments, for example military applications, a plurality of kits 110 can be licensed (e.g., to the Navy) or sold to provide a plurality of training terminals 120. Due to the compact nature of the kits 110 and of the training terminals 120 (relative to current simulators that may each take a full room, or real aircraft that may take a full hangar), there can be many training terminals 120 housed within a small area, such as a single room in a naval vessel. An instructor terminal 220 is not necessarily required, but could also be provided if desired. With this configuration, many pilots can (each using a different training terminal 120 on the vessel) remotely connect with the simulation application site 370 at the same time to train, for example, for a particular mission. This provides access to the simulation system while a crew is at sea.

For some applications (such as large-scale deployments within the military), it may be desirable to deploy dedicated servers. For example, the Navy may purchase or lease a server dedicated to its own use. Such a server could itself be housed on a naval vessel and communicate with training terminals over a private intranet. This may be beneficial where private communication is desired to protect the details of the simulation (e.g., if classified). This may also be beneficial where the training terminals are so remotely located that communication to a central server would be difficult via conventional long-range communication networks (e.g., from aboard a ship in the ocean to a land-based server site).

In accordance with another application, the simulation application site 370 can receive inputs from remote locations. For example, a battlefield can be simulated to facilitate a combat simulation for trainees. The trainee combatants can send and receive radar signals and enemy targets can be identified, locked on, fired on, and destroyed while many miles apart. Several aircraft, enemy and friendly, can be depicted in the displays and may include other trainees and/or instructors participating in the simulated flight. The simulation sessions can be recorded so that tactics can be analyzed and options discussed for future flight simulations and mission rehearsals.

As each of the above examples pertain to a single simulation, it is also noted that the server at simulation application site is capable of running a plurality of simulations concurrently. Further in this vein, it is also possible for an instructor to be actively engaged in multiple simulations at the same time, and thus be training multiple pilots at the same time.

Although embodiments described herein are made with reference to example embodiments, it should be appreciated by those skilled in the art that various modifications are well within the scope and spirit of this disclosure. For instance, many examples described herein refer to use of the system for general aviation pilot training. However, the system is applicable to pilot training for any vehicle, aircraft, drone—manned or unmanned, etc. in any applicable field, including all military branches and commercial applications. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein. The disclosure is intended to include all such modifications and alterations disclosed herein or ascertainable therefrom by persons of ordinary skill in the art without undue experimentation.

What is claimed is:

1. A freestanding pilot training system comprising:
a floor-resting base;
a seat pan having a support column attached thereto;
a plurality of actuators connecting the base and the seat pan and positioned above the base and below the seat pan, the plurality of actuators being configured to move the seat pan linearly and rotationally along x, y, and z axes;
a pedal support removably connected to the seat pan via a first support post;
a yoke support removably connected to the seat pan via a second support post;
a head-mounted display configured to display an output of a flight simulation software reflecting a simulated flight environment, wherein a point of view of the head-mounted display is synchronized to motion of the seat pan;
wherein at least one of the first support post or the second support post is secured via a collar removably engaged with said support column; and
a training terminal mounted on the freestanding pilot training system and comprising a processor,
wherein the pedal support and the yoke support are configured to move synchronously with the seat pan.

2. The freestanding pilot training system of claim 1, further comprising a plurality of adjustable legs connected to the base for height adjustment and/or leveling of the seat pan above a floor.

3. The freestanding pilot training system of claim 1, wherein each of the plurality of actuators includes a first end secured to a top side of the base and a second end linked to a bottom side of the seat pan via a ball joint.

4. The freestanding pilot training system of claim 1, further comprising a trainee input device coupled to the training terminal, the trainee input device configured to receive inputs from a trainee seated in the seat pan to control at least one aspect of the simulated flight environment.

5. The freestanding pilot training system of claim 1, further comprising an instructor terminal located at a remote instructor site, the instructor terminal configured to interface with the training terminal over a network.

6. The freestanding pilot training system of claim 5, further comprising an instructor input device at the instructor site, the instructor input device configured to change various parameters in the flight simulation software during a training session.

7. The freestanding pilot training system of claim 5, wherein the instructor terminal and the training terminal include corresponding communication devices to facilitate communication in real-time between an instructor and a trainee.

8. The freestanding pilot training system of claim 4, wherein the trainee input device includes rudder pedals, a yoke, and a throttle quadrant.

9. The freestanding pilot training system of claim 1, further comprising sensors to track physiological data of a trainee.

10. The freestanding pilot training system of claim 1, the pedal support and the yoke support being adjustable relative to the seat pan to configure their respective positions in conformity with a particular aircraft cockpit being simulated in the simulated flight environment.

11. The freestanding pilot training system of claim 1, wherein the training terminal is directly secured to the floor-resting base.

12. The freestanding pilot training system of claim 1, wherein the freestanding pilot training system is configured to be packaged within a single deliverable package and transportable as an integrated unit.

* * * * *